(12) United States Patent
Zhang et al.

(10) Patent No.: US 10,594,859 B2
(45) Date of Patent: Mar. 17, 2020

(54) COMMUNICATION METHOD, APPARATUS, AND SYSTEM

(71) Applicant: HUAWEI TECHNOLOGIES CO., LTD., Shenzhen, Guangdong (CN)

(72) Inventors: Hao Zhang, Hangzhou (CN); Qiang Hua, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/164,527

(22) Filed: Oct. 18, 2018

(65) Prior Publication Data

US 2019/0052750 A1 Feb. 14, 2019

Related U.S. Application Data

(63) Continuation of application No. PCT/CN2016/079661, filed on Apr. 19, 2016.

(51) Int. Cl.
*H04M 3/42* (2006.01)

(52) U.S. Cl.
CPC .... *H04M 3/42042* (2013.01); *H04M 3/42102* (2013.01); *H04M 2201/14* (2013.01)

(58) Field of Classification Search
CPC . H04M 3/42; H04M 3/42059; H04M 2242/28
USPC .............. 379/142.01–142.06, 201.01, 142.1
See application file for complete search history.

(56) References Cited

U.S. PATENT DOCUMENTS

| 2001/0043623 | A1* | 11/2001 | Goto ........................ H04Q 3/62 370/524 |
| 2005/0048967 | A1* | 3/2005 | Hoglander ........... H04Q 3/0025 455/426.1 |
| 2014/0113604 | A1 | 4/2014 | Kim |

FOREIGN PATENT DOCUMENTS

| CN | 200990638 Y | 12/2007 |
| CN | 101827176 A | 9/2010 |
| CN | 102694930 A | 9/2012 |
| CN | 104079728 A | 10/2014 |

* cited by examiner

*Primary Examiner* — Melur Ramakrishnaiah
(74) *Attorney, Agent, or Firm* — Womble Bond Dickinson (US) LLP

(57) ABSTRACT

Embodiments of the present disclosure provide a communication method, apparatus, and system. An information device provided herein may be configured to keep a call record corresponding to the call request, and obtain calling side information (including a number of a calling terminal) from the call record when receiving a first query request sent by a second terminal. The information device may also be configured to send the calling side information to the second terminal. The second terminal may be configured to send the first query request after receiving the call request, and display the calling side information. Thus, when the calling terminal calls a called terminal using the enterprise switchboard, the called terminal can obtain the number of the calling terminal corresponding to the current call and display the number of the calling terminal, that identifies a real calling user based on the number.

15 Claims, 10 Drawing Sheets

COMMUNICATION METHOD, APPARATUS, AND SYSTEM

CROSS-REFERENCE TO RELATED APPLICATIONS

This application is a continuation of International Patent Application No. PCT/CN2016/079661, filed on Apr. 19, 2016, the disclosure of which is hereby incorporated by reference in its entirety.

TECHNICAL FIELD

The present disclosure relates to the field of communications technologies, and in particular, to a communication method, apparatus, and system.

BACKGROUND

In a current enterprise communication solution, when a calling terminal calls a called terminal by using an enterprise switchboard in an enterprise network, a calling number displayed on the called terminal is usually a number of the enterprise switchboard, for example, 075528560888, but not a number of the calling terminal.

Consequently, in the prior art, a user of the called terminal can neither identify a real calling user nor call back, resulting in poor user experience.

SUMMARY

Embodiments of the present invention provide a communication method, apparatus, and system, to resolve a prior-art problem that a user of a called terminal can neither identify a real calling user nor call back when a calling terminal calls the called terminal by using an enterprise switchboard.

According to a first aspect, a communications system is provided, where the communications system includes a first terminal, a second terminal, and an information device;

the first terminal is configured to send a call request to the second terminal by using an enterprise switchboard in an enterprise network;

the information device is configured to: keep a first call record corresponding to the call request, where calling side information in the first call record includes a number of the first terminal, and called side information in the first call record includes an identifier of the second terminal; obtain the calling side information from the first call record based on the identifier of the second terminal when receiving a first query request that is sent by the second terminal and that includes the identifier of the second terminal; and send a first query response including the calling side information to the second terminal; and the second terminal is configured to: send the first query request to the information device after receiving the call request, and display the calling side information in the first query response after receiving the first query response.

According to an embodiment of the first aspect of the present invention, when a calling terminal (namely, the first terminal) calls a called terminal (namely, the second terminal) by using the enterprise switchboard, the information device keeps the call record including a number of the calling terminal, so that after receiving the call request, the called terminal can obtain the number of the calling terminal corresponding to the current call from the information device and display the number of the calling terminal. Therefore, a user of the called terminal can identify a real calling user based on the number, and can call the calling terminal by using the number, and user experience is better.

In a first possible embodiment of the first aspect, the first terminal may be specifically an extension in the enterprise network, and correspondingly, the number of the first terminal is an extension number of the first terminal. Specifically, the first terminal may alternatively be a unified communications UC client or a terminal that runs a UC client, and correspondingly, the number of the first terminal is a UC number of the first terminal.

With reference to the first aspect or the first possible embodiment of the first aspect, in a second possible embodiment, the second terminal may be specifically configured to send the first query request when detecting the call request.

Further, with reference to the second possible embodiment of the first aspect, in a third possible embodiment, the second terminal may be specifically configured to display, in a suspended window on a caller identification display screen of the second terminal, the calling side information in the first query response when receiving the first query response.

According to the second or the third possible embodiment of the first aspect of the present invention, when receiving an incoming call, the user of the called terminal may learn of the number of the calling terminal rather than see only a unified number of the enterprise switchboard. Therefore, user experience is better. The implementation may be used to implement a caller identification display scenario.

With reference to the second or the third possible embodiment of the first aspect, in a fourth possible embodiment, the information device may be specifically configured to: determine, as the first call record, a call record that is of a call made at a moment closest to a moment of receiving the first query request and that is in call records whose recorded called side information includes the identifier of the second terminal, obtain the calling side information from the first call record, and send the first query response including the calling side information to the second terminal.

With reference to the first aspect or the first possible embodiment of the first aspect, in a fifth possible embodiment, the second terminal may be specifically configured to send the first query request when detecting that a call corresponding to the call request is unanswered.

Further, with reference to the fifth possible embodiment of the first aspect, in a sixth possible embodiment, the second terminal may be specifically configured to display the calling side information on a missed call display screen of the second terminal after receiving the first query response.

According to the sixth possible embodiment of the first aspect of the present invention, if the called terminal does not answer an incoming call from the calling terminal, the called terminal obtains the number of the calling terminal and displays the number of the calling terminal on a missed call display screen of the called terminal. Therefore, the user of the called terminal may learn of the number of the calling terminal corresponding to the missed call rather than see only the unified number of the enterprise switchboard. If the user of the called terminal wants to call back, the user of the called terminal can directly initiate a call by using a calling number (namely, the number of the enterprise switchboard) and the number of the first terminal (such as the extension number of the first terminal or the UC number of the first terminal) that are in the call request. Therefore, user experience is better. The embodiment may be used to implement displaying a missed call scenario.

With reference to the fifth or the sixth possible embodiment of the first aspect, in a seventh possible embodiment, the first call record further includes a status of the call corresponding to the call request; and that the information device is configured to obtain the calling side information from the first call record based on the identifier of the second terminal may specifically include: determining, as the first call record, a call record that is of a call made at a moment closest to a moment of receiving the first query request and that is in unanswered-state call records whose recorded called side information includes the identifier of the second terminal, and obtaining the calling side information from the first call record.

With reference to any one of the first aspect or the first to the seventh possible embodiments of the first aspect, in an eighth possible embodiment, before sending the first query request, the second terminal may further first determine that a calling number in the call request is a switchboard number of the enterprise network.

According to a second aspect, a communication method is provided, where the method includes:

sending, by a first terminal, a call request to a second terminal by using an enterprise switchboard in an enterprise network; and sending, by the first terminal to a contact list server, a first call record corresponding to the call request, where calling side information in the first call record includes a number of the first terminal, and called side information in the first call record includes an identifier of the second terminal.

In a first possible embodiment of the second aspect, the first terminal may specifically send the first call record to the contact list server before sending the call request or when sending the call request.

According to the embodiment of the second aspect of the present invention, when a calling terminal (namely, the first terminal) calls a called terminal (namely, the second terminal) by using the enterprise switchboard, the calling terminal may upload, to the contact list server, the call record corresponding to the call request, so that the called terminal can obtain a number of the calling terminal corresponding to the current call from the contact list server. Therefore, a user of the called terminal can identify a real calling user, and can call the calling terminal by using the number, and user experience is better.

According to a third aspect, a communication method is provided, where the method includes:

sending, by a second terminal, a first query request to an information device after receiving a call request sent by a first terminal by using an enterprise switchboard, where the first query request includes an identifier of the second terminal;

receiving, by the second terminal, a first query response returned by the information device, where the first query response includes information about the first terminal, and the information about the first terminal includes a number of the first terminal; and displaying, by the second terminal, the information about the first terminal in the first query response.

According to the embodiment of the third aspect of the present invention, when a calling terminal (namely, the first terminal) calls a called terminal (namely, the second terminal) by using the enterprise switchboard, after receiving the call request, the called terminal may obtain a number of the calling terminal corresponding to the current call from the information device, and display the number of the calling terminal. Therefore, a user of the called terminal can identify a real calling user based on the number, and can call the calling terminal by using the number, and user experience is better.

In a first possible embodiment of the third aspect, the sending, by a second terminal, a first query request to an information device after receiving a call request from a first terminal specifically includes: sending, by the second terminal, the first query request when detecting the call request.

Further, with reference to the first possible embodiment of the third aspect, in a second possible embodiment, the displaying, by the second terminal, the information about the first terminal in the first query response specifically includes: displaying, by the second terminal in a suspended window on a caller identification display screen of the second terminal, calling side information in the first query response when receiving the first query response.

According to the first or the second possible embodiment of the third aspect of the present invention, when receiving an incoming call, the user of the called terminal may learn of the number of the calling terminal rather than see only a unified number of the enterprise switchboard. Therefore, user experience is better. The embodiment may be used to implement a caller identification display scenario.

In a third possible embodiment of the third aspect, the sending, by a second terminal, a first query request to an information device after receiving a call request from a first terminal specifically includes: sending, by the second terminal, the first query request when detecting that a call corresponding to the call request is unanswered.

Further, with reference to the third possible embodiment of the third aspect, in a fourth possible embodiment, the displaying, by the second terminal, the information about the first terminal in the first query response specifically includes: displaying, by the second terminal, the calling side information on a missed call display screen of the second terminal.

According to the fourth possible embodiment of the third aspect of the present invention, if the called terminal does not answer an incoming call from the calling terminal, the called terminal obtains the number of the calling terminal and displays the number of the calling terminal on a missed call display screen of the called terminal. Therefore, the user of the called terminal may learn of the number of the calling terminal corresponding to the missed call rather than see only the unified number of the enterprise switchboard. If the user of the called terminal wants to call back, the user of the called terminal can directly initiate a call by using a calling number (namely, the number of the enterprise switchboard) and the number of the first terminal (such as the extension number of the first terminal or the UC number of the first terminal) that are in the call request. Therefore, user experience is better. The embodiment may be used to implement displaying a missed call scenario.

With reference to any one of the third aspect or the first to the fourth possible embodiments of the third aspect, in a fifth possible embodiment, before sending the first query request, the second terminal may further first determine that a calling number in the call request is a switchboard number of the enterprise network.

According to a fourth aspect, a communication method is provided, where the method includes:

keeping a first call record that corresponds to a call request sent by a first terminal to a second terminal by using an enterprise switchboard in an enterprise network, where calling side information in the first call record includes a number of the first terminal, and called side information in the first call record includes an identifier of the second terminal; and obtaining the calling side information from the first call record based on the identifier of the second terminal when receiving the first query request that is sent by the second terminal and that includes the identifier of the second terminal; and sending a first query response including the calling side information to the second terminal.

In a first possible embodiment of the fourth aspect, the obtaining the calling side information from the first call record based on the identifier of the second terminal specifically includes: determining, as the first call record, a call record that is of a call made at a moment closest to a moment of receiving the first query request and that is in call records whose recorded called side information includes the identifier of the second terminal, and obtaining the calling side information from the first call record.

In a second possible embodiment of the fourth aspect, the first call record further includes a status of a call corresponding to the call request; and the obtaining the calling side information from the first call record based on the identifier of the second terminal specifically includes: determining, as the first call record, a call record that is of a call made at a moment closest to a moment of receiving the first query request and that is in unanswered-state call records whose recorded called side information includes the identifier of the second terminal, and obtaining the calling side information from the first call record.

According to a fifth aspect, a communications apparatus is provided, where the communications apparatus includes a call unit and a call recording unit;

the call unit is configured to send a call request to a called terminal by using an enterprise switchboard in an enterprise network; and the call recording unit is configured to send a first call record to a contact list server, where calling side information in the first call record includes a number of the communications apparatus, and called side information in the first call record includes an identifier of the called terminal.

In a first possible embodiment of the fifth aspect, the call recording unit is specifically configured to send the first call record to the contact list server before sending the call request or when sending the call request.

According to a sixth aspect, a communications apparatus is provided, where the communications apparatus includes a call unit, a call recording unit, and a display unit;

the call unit is configured to receive a call request sent by a first terminal by using an enterprise switchboard in an enterprise network;

the call recording unit is configured to: send a first query request to an information device after the call unit receives the call request, where the first query request includes an identifier of the communications apparatus; and receive a first query response returned by the information device, where the first query response includes information about the first terminal, and the information about the first terminal includes a number of the first terminal; and the display unit is configured to display the information about the first terminal in the first query response received by the call recording unit.

In a first possible embodiment of the sixth aspect, the call unit is specifically configured to detect whether the call request is received; and the call recording unit is specifically configured to send the first query request when the call unit detects that the call request is received.

In a second possible embodiment of the sixth aspect, the call unit is further configured to detect a status of a call corresponding to the call request; and the call recording unit is specifically configured to send the first query request when the call unit detects that the call is unanswered.

With reference to the second possible embodiment of the sixth aspect, in a third possible embodiment, the display unit is specifically configured to display the calling side information on a missed call display screen of the second terminal.

With reference to any one of the sixth aspect or the first to the third possible embodiments of the sixth aspect, in a fourth possible embodiment, the call recording unit may be specifically configured to send the first query request when determining that a calling number in the call request is a switchboard number of the enterprise network.

According to a seventh aspect, an information device is provided, where the information device includes a call recording unit, a receiving unit, and a sending unit;

the call recording unit is configured to: keep a first call record that corresponds to a call request sent by a first terminal to a second terminal by using an enterprise switchboard in an enterprise network, where calling side information in the first call record includes a number of the first terminal, and called side information in the first call record includes an identifier of the second terminal; obtain the calling side information from the first call record based on the identifier of the second terminal when the receiving unit receives a first query request that is sent by the second terminal and that includes the identifier of the second terminal; and send, by using the sending unit, a first query response including the calling side information to the second terminal;

the receiving unit is configured to receive the first query request; and the sending unit is configured to send the first query response.

In a first possible embodiment of the seventh aspect, that the call recording unit is configured to obtain the calling side information from the first call record based on the identifier of the second terminal specifically includes: determining, as the first call record, a call record that is of a call made at a moment closest to a moment of receiving the first query request and that is in call records whose recorded called side information includes the identifier of the second terminal, and obtaining the calling side information from the first call record.

In a second possible embodiment of the seventh aspect, the first call record further includes a status of a call corresponding to the call request; and that the call recording unit is configured to obtain the calling side information from the first call record based on the identifier of the second terminal specifically includes: determining, as the first call record, a call record that is of a call made at a moment closest to a moment of receiving the first query request and that is in unanswered-state call records whose recorded called side information includes the identifier of the second terminal, and obtaining the calling side information from the first call record.

According to embodiments of the present invention, when the calling terminal calls the called terminal by using the enterprise switchboard, the information device keeps the call record including the number of the calling terminal, so that after receiving the call request, the called terminal can obtain the number of the calling terminal corresponding to the current call from the information device and display the number of the calling terminal. Therefore, the user of the called terminal can identify a real calling user based on the number, and can call the calling terminal by using the number, and user experience is better.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 5A to FIG. 5C-1 and FIG. 5C-2 are schematic flowcharts of three implementations according to Embodiment 1 of the present invention;

DESCRIPTION OF EMBODIMENTS

To make the objectives, technical solutions, and advantages of the present invention clearer, the following further describes the implementations of the present invention in detail with reference to the accompanying drawings.

Figure 1:
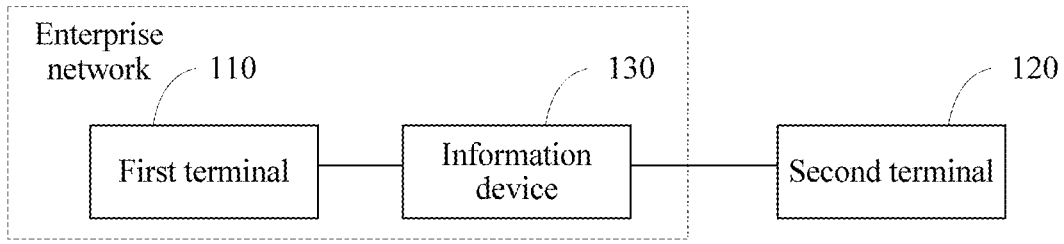
FIG. 1 and FIG. 2A to FIG. 2C are schematic structural diagrams of networking of a communications system according to an embodiment of the present invention.

FIG. 1 is a schematic structural diagram of a communications system 100 according to Embodiment 1 of the present invention.

The communications system 100 includes a first terminal 110, a second terminal 120, and an information device 130. The first terminal 110 may serve as a calling terminal to call the second terminal by using an enterprise switchboard in an enterprise network. The information device 130 is configured to: store a call record including calling side information (namely, information about the calling terminal), and provide a function of querying the calling side information.

The first terminal 110 is located in the enterprise network, and may be specifically an extension in the enterprise network, or may be a unified communications (UC) client or a terminal that runs a UC client. The terminal that runs the UC client may be specifically a mobile terminal, a personal computer, or the like.

The second terminal 120 may be specifically an app that implements a function of querying and displaying the calling side information, or may be a mobile terminal that implements a function of querying and displaying the calling side information. The mobile terminal may specifically implement, by running an application (App) on the mobile terminal, the function of querying and displaying the calling side information.

In an example of a specific implementation, the communications system 100 may be implemented in the following three manners.

Figure 2A:
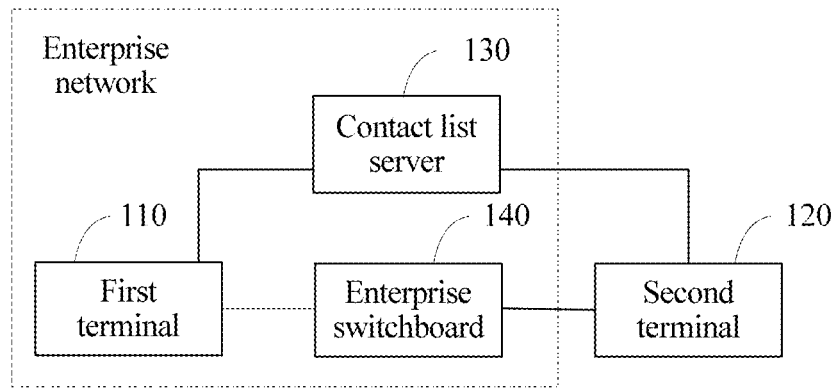

As shown in FIG. 2A, the information device 130 may be specifically a contact list server (denoted as a contact list server 130 in FIG. 2A). The first terminal 110 uploads, to the contact list server, a call record corresponding to a call request sent by the first terminal 110 by using an enterprise switchboard 140. The contact list server provides the function of querying the calling side information.

Figure 2B:
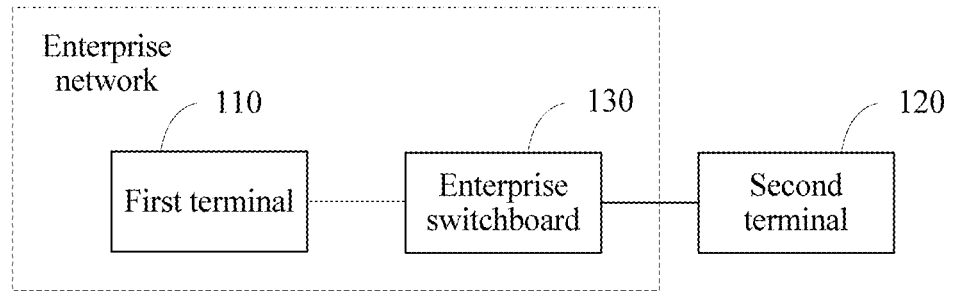

As shown in FIG. 2B, the information device 130 may be specifically the enterprise switchboard (denoted as an enterprise switchboard 130 in FIG. 2B). A call request sent by the first terminal 110 when the first terminal 110 calls the second terminal 120 is transmitted by using the enterprise switchboard 130, and the enterprise switchboard 130 keeps a call record corresponding to the call request when receiving the call request sent by the first terminal. The enterprise switchboard 130 provides the function of querying the calling side information.

Figure 2C:
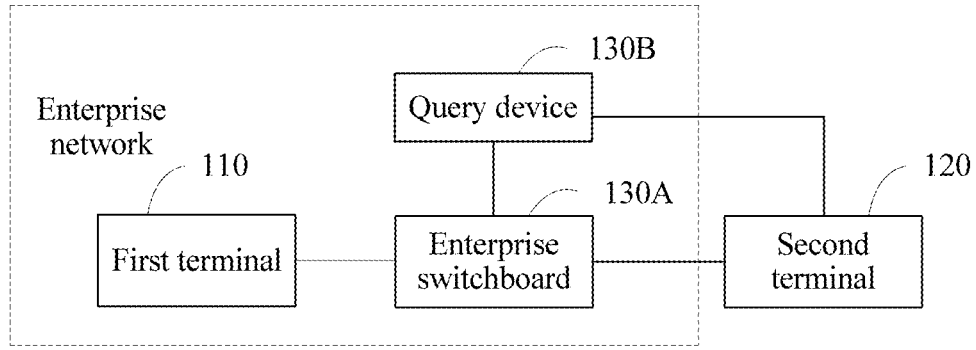

As shown in FIG. 2C, the information device 130 specifically includes an enterprise switchboard 130A and a query device 130B. A call request sent by the first terminal 110 when the first terminal 110 calls the second terminal 120 is transmitted by using the enterprise switchboard 130A, and the enterprise switchboard 130A keeps a call record corresponding to the call request when receiving the call request sent by the first terminal, and stores the call record in a memory accessible to the query device 130B. Correspondingly, the query device 130B is configured to provide the function of querying the calling side information.

Figure 3:
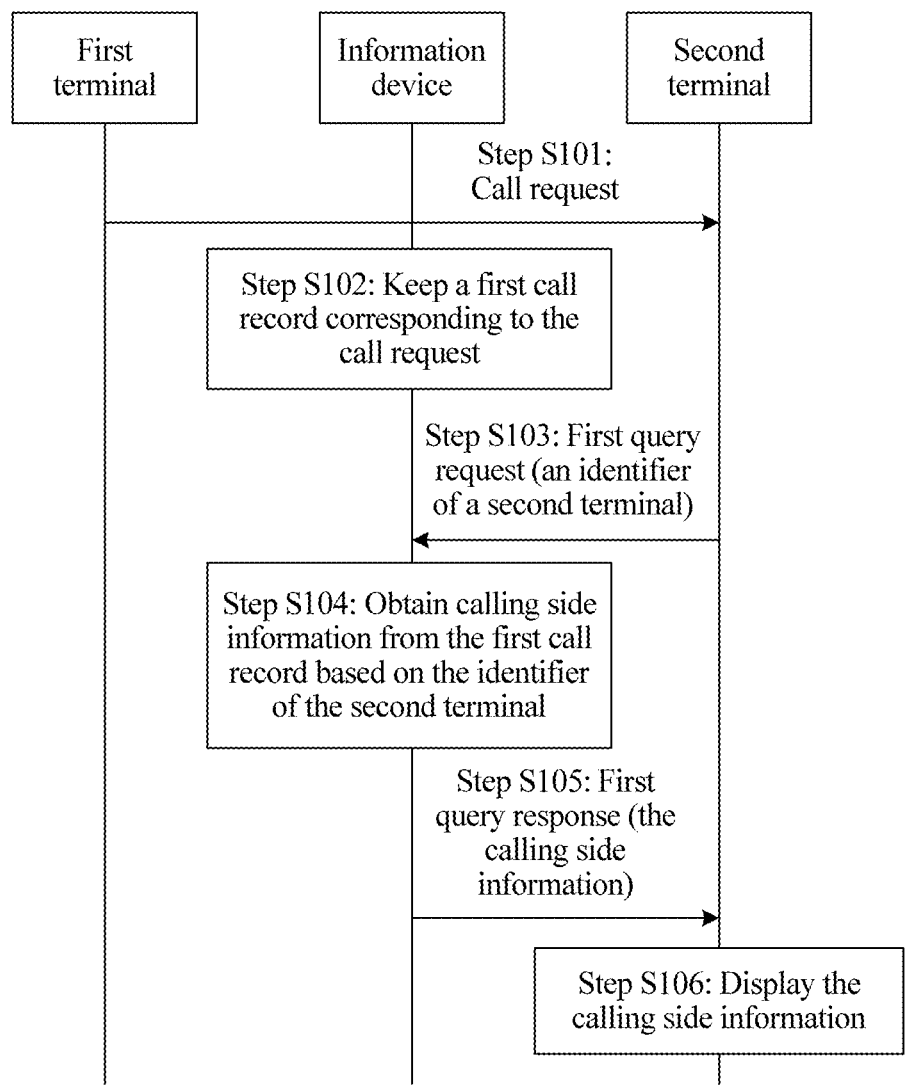
FIG. 3 is a schematic flowchart of a method according to Embodiment 1 of the present invention.
Figure 4:
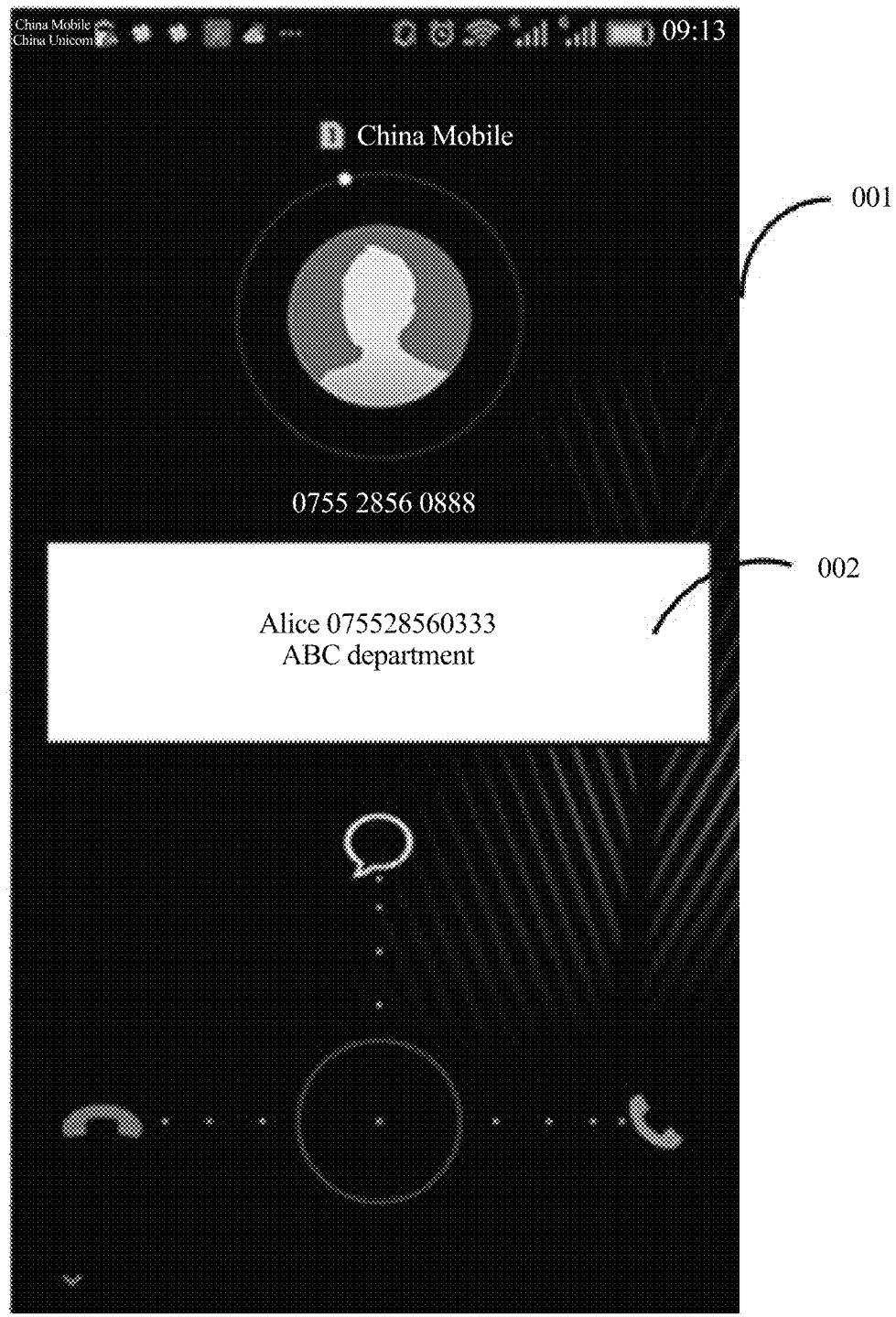
FIG. 4 is a schematic diagram of an interface according to Embodiment 1 of the present invention.

The following describes, with reference to FIG. 1, FIG. 3, and FIG. 4, a method provided in Embodiment 1 of the present invention, and further separately describes, with reference to FIG. 2A to FIG. 2C and FIG. 5A to FIG. 5C-1 and FIG. 5C-2, three specific implementations of the method provided in Embodiment 1 of the present invention.

FIG. 3 is a schematic flowchart of the method according to Embodiment 1 of the present invention. The method in Embodiment 1 of the present invention is applied to the communications system 100 shown in FIG. 1.

As shown in FIG. 3, the method provided in Embodiment 1 of the present invention includes the following steps.

Step S101: A first terminal sends a call request to a second terminal by using an enterprise switchboard in an enterprise network.

Specifically, the call request sent by the first terminal is transmitted to the enterprise switchboard. The enterprise switchboard replaces a calling number (namely, a number of the first terminal, for example, 1234) in the call request with a number (for example, 075528560888) of the enterprise switchboard, and then sends the call request to the second terminal by using an external network. In an example of a specific implementation, the external network may be specifically a public switched telephone network (PSTN) provided by an operator, and the enterprise switchboard may specifically send the call request to the second terminal through a trunking gateway (trunking gateway) in the enterprise network by using the PSTN network. In an example of a specific implementation, the call request that is sent by the first terminal and that is received by the enterprise switchboard may be specifically Session Initiation Protocol (SIP) Invite (invite) signaling, and the call request is converted into signaling in the PSTN network when passing through the trunking gateway, and is sent to the second terminal by using the PSTN network.

A called number in the call request is a number of the second terminal.

Step S102: An information device keeps a first call record corresponding to the call request, where calling side information in the first call record includes a number of the first terminal, and called side information in the first call record includes an identifier of the second terminal.

The identifier of the second terminal may be specifically the number of the second terminal, or may be another identifier of the second terminal, for example, a subscriber identifier (such as an employee identity of a user of the second terminal, or a UC account number) bound to the second terminal.

The calling side information may further include description information of a user of the first terminal, for example, a name of the user, or a department to which the user belongs.

The user of the first terminal is a user corresponding to the first terminal. For example, the first terminal is a UC client, and correspondingly the user of the first terminal is a user corresponding to a UC account that is logged in on the UC client. For another example, the first terminal is an extension in the enterprise network, and correspondingly the user of the first terminal is a user corresponding to the extension, where a correspondence between an extension number and description information of the user may be pre-stored on the extension or the information device.

When the first terminal is an extension in the enterprise network, the number of the first terminal is specifically an extension number of the first terminal.

When the first terminal is a unified communications (UC) client or a terminal that runs a UC client, the number of the first terminal is specifically a UC number of the first terminal. The UC number is a number corresponding to a UC account that is logged in on the UC client.

Step S103: The second terminal sends a first query request to the information device after receiving the call request, where the first query request includes the identifier of the second terminal.

The identifier of the second terminal may be pre-stored in the second terminal. Before sending the first query request, the second terminal obtains the pre-stored identifier of the second terminal, and adds the obtained identifier of the second terminal to the first query request. If the identifier of the second terminal is specifically the number of the second terminal, the second terminal may read the number of the second terminal from a called number field in the call request, and add the number of the second terminal to the first query request.

An address of the information device is preconfigured in the second terminal, and in step S103, the first query request is sent to the information device based on the address of the information device.

In addition, before sending the first query request, the second terminal may further first determine that a calling number in the call request is a switchboard number of the enterprise network. In other words, the second terminal sends the first query request when determining that the calling number in the call request is the switchboard number of the enterprise network. Correspondingly, if the second terminal determines that the calling number in the call request is not the switchboard number of the enterprise network, the second terminal does not send the first query request. Specifically, the second terminal may determine, based on the switchboard number that is of the enterprise network and that is stored in the second terminal, whether the calling number in the call request is the switchboard number of the enterprise network.

Step S104: The information device obtains the calling side information from the first call record based on the identifier of the second terminal when receiving the first query request that is sent by the second terminal and that includes the identifier of the second terminal.

Step S105: The information device sends a first query response including the calling side information to the second terminal.

Step S106: The second terminal displays the calling side information in the first query response after receiving the first query response.

Two specific scenarios may be implemented by using Embodiment 1 of the present invention.

A scenario M is a caller identification display scenario. In this scenario, a called terminal (namely, the second terminal in Embodiment 1 of the present invention) displays a number of a calling terminal (namely, the first terminal in Embodiment 1 of the present invention) in a suspended window on a caller identification display screen of the called terminal when receiving the call request. Therefore, when receiving an incoming call, a user of the called terminal may learn of the number of the calling terminal rather than see only the unified number of the enterprise switchboard, and user experience is better. Further, if the user of the second terminal wants to call the first terminal, the user of the second terminal may directly initiate a call by using the calling number (namely, the number of the enterprise switchboard) and the number of the first terminal (such as the extension number of the first terminal or the UC number of the first terminal) that are in the call request.

A scenario N is a missed call scenario. In this scenario, if the called terminal does not answer an incoming call from the calling terminal, the called terminal obtains the number of the calling terminal and displays the number of the calling terminal on a missed call display screen of the called terminal. Therefore, the user of the called terminal may learn of the number of the calling terminal corresponding to the missed call rather than see only the unified number of the enterprise switchboard. If the user of the called terminal wants to call back, the user of the called terminal can directly initiate a call by using the calling number (namely, the number of the enterprise switchboard) and the number of the first terminal (such as the extension number of the first terminal or the UC number of the first terminal) that are in the call request. Therefore, user experience is better.

During implementation of the scenario M, in step S103, the second terminal may send the first query request when detecting the call request, and display, in a suspended window on a caller identification display screen of the second terminal, calling side information in the first query response when receiving the first query response. Correspondingly, in step S104, the information device may determine, as the first call record, a call record that is of a call made at a moment closest to a moment of receiving the first query request and that is in call records whose recorded called side information includes the identifier of the second terminal, and obtain the calling side information from the first call record.

In an example of a specific implementation, an app used to query for and display the calling side information may be preinstalled and run in the second terminal. Specifically, the app detects an incoming call on the second terminal in real time by invoking a listen method of an API TelephonyManager class provided by an operating system of the second terminal. In addition, when detecting an incoming call (in other words, when detecting the call request), the app sends the first query request to the information device to obtain calling side information corresponding to the current incoming call, then displays a suspended window on the caller identification display screen of the second terminal by invoking a WindowManager class provided by the operating system of the second terminal, and displays the obtained calling side information in content (content) of the suspended window. As shown in FIG. 4, 001 represents an existing caller identification display screen, and 002 represents the displayed suspended window in this embodiment of the present invention.

It should be noted that, the displayed suspended window in this embodiment of the present invention is displayed on the existing caller identification display screen in an overlapped manner, and this has no impact on a display process of the caller identification display screen.

Further, the second terminal may further invoke the listen method to detect whether a call corresponding to the call request ends, and close the suspended window when detecting that the call ends.

During implementation of the scenario N, in step S103, the second terminal may send the first query request when detecting that a call corresponding to the call request is unanswered (for example, the call remains unanswered after time expires, or the call is rejected), and display the calling side information on a missed call display screen of the second terminal. Correspondingly, the first call record further includes a status of the call corresponding to the call request. In step S104, the information device may determine, as the first call record, a call record that is of a call made at a moment closest to a moment of receiving the first query request and that is in unanswered-state call records whose recorded called side information includes the identifier of the second terminal, and obtain the calling side information from the first call record.

Specifically, when detecting that the second terminal does not answer the incoming call, the app sends the first query request to the information device to obtain the calling side information corresponding to the incoming call, records the calling side information as missed call information, and displays the missed call information on the missed call display screen of the second terminal. Specifically, the missed call information may be displayed when the incoming call is unanswered, or may be displayed when the user views the missed call information. During the implementation of the scenario N, the call record may further include a start time and an end time of the call. Correspondingly, in step S104 to step S106, the information device may further send the start time and the end time in the call record to the second terminal, so that the second terminal displays the start time and the end time.

In specific implementations of the scenario M and the scenario N, the call record stored in the information device may further include a start time of a call corresponding to the call record. In step S104, the information device may determine, based on the start time in the call record, a length from a time of keeping the call record to a current time. For example, there are three call records whose called side information includes the identifier of the second terminal. A start time of a call record 1 is 10:01, a start time of a call record 2 is 10:20, and a start time of a call record 3 is 10:30. the call record that is of the call made at the moment closest to the moment (for example, 10:31) of receiving the first query request and that is in the call records whose called side information includes the identifier of the second terminal is the call record 3.

In an optional implementation, the call record kept by the information device includes a start time of a call corresponding to the call record, and the first query request includes a time at which the second terminal receives the call request. In step S104, the information device may further determine a call record as the first call record, wherein the call record in the call records whose recorded called side information includes the identifier of the second terminal and in which a start time meets a requirement that a difference between the stat time and the time in the first query request is smallest and/or is less than a preset threshold (for example, 2 s), and obtain the calling side information from the first call record.

The following further describes, with reference to FIG. 2A and FIG. 5A, a first implementation (referred to as an implementation A hereinafter) of the method provided in Embodiment 1 of the present invention.

Figure 5A:
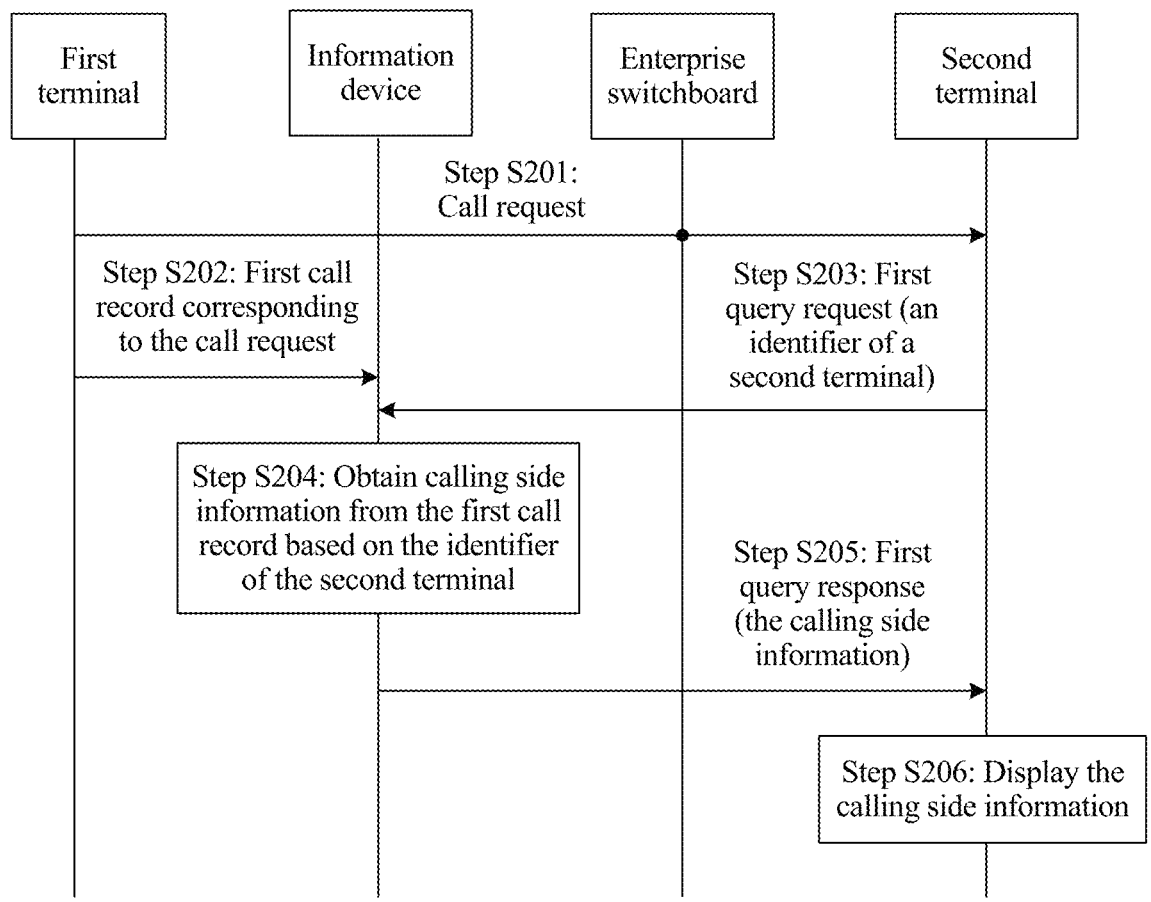

FIG. 5A is a schematic flowchart of an implementation A of the method according to Embodiment 1 of the present invention. The implementation A is applied to the communications system 100 shown in FIG. 2A, and an information device in the implementation A is specifically a contact list server.

Step S201 is the same as step S101. Details are not described herein again.

Step S202: The first terminal sends, to the information device, a first call record corresponding to the call request, where calling side information in the first call record includes a number of the first terminal, and called side information in the first call record includes an identifier of the second terminal.

An address of the information device is preconfigured in the first terminal, and in step S202, a first query request is sent to the information device based on the address of the information device. The query request may be specifically a Hypertext Transfer Protocol (Hypertext Transfer Protocol, HTTP) request.

In an example of a specific implementation, the first terminal may perform step 201 and step 202 when detecting a user operation used to indicate a call for the second terminal (for example, detecting an operation of taping a call menu). The first terminal may further perform step S202 when determining that a called number of the called terminal (namely, a called number of the call indicated by the user operation) is a mobile number. Correspondingly, if the first terminal determines that the number of the called terminal is not the mobile number, the first terminal does not perform step S202 or a subsequent step.

Step S201 and step S202 may be successively performed, or may be simultaneously performed. If the scenario M is performed, step S201 and step S202 are simultaneously performed, or step S202 is performed before step S201, to ensure that during implementation of the scenario M, the information device receives the first call record before receiving the first query request. If the scenario N is performed, step S202 may be performed at any moment (for example, when step 201 is to be performed, or after step 201 is performed, or when it is detected that the call is a normal call) before the call corresponding to the call request ends, or when it is detected that the call ends, or when it is detected that the call is unanswered. If only a call record corresponding to an unanswered call is sent, the first call record may be uploaded when it is detected that the call is unanswered.

It should be noted that, when detecting the user operation used to indicate the call for the second terminal (for example, detecting the operation of taping the call menu), the first terminal may determine that the second terminal is called. In this case, the calling side information and the called side information that are included in the first call record may be obtained. In other words, information (namely, the information included in the first call record) required to perform step S202 may be obtained before step S201 is performed. Therefore, step S202 may be performed before step S201.

After receiving the first call record, the information device stores the first call record. It may be understood that, if there are a plurality of calls, the information device stores a plurality of call records.

If step S202 is performed before step S201, a call record uploaded by a calling terminal may further include an uploading time or a predicted call time. In step S104, the information device may determine a length from a time of keeping the call record to a current time based on an uploading time or a predicted call time included in each call record. In addition, the information device may alternatively sort received call records based on a sequence of receiving the call records of the calling terminals, and determine, in step S104, a relative length from a time of keeping each call record to a current time based on a result of the sorting.

Step S203 to step S206 are the same as or similar to step S103 to step S106. Details are not described again.

If step S202 is performed after the call ends, the first call record sent by the first terminal to the information device may further include a start time and an end time of the call.

If step S202 is performed before the call ends, the method may further include the following steps. Step S207: The first terminal determines a current status of the call, and sends, to the information device, an update message that carries the current status of the call, to update a call status in the call record of the call.

For example, if step S202 is performed before step S201, after step S201 is performed, the current status of the call is determined as a call start, and correspondingly, the update message may further include the start time of the call.

For another example, when a first piece of signaling (for example, SIP signaling 180 or SIP signaling 200) that is returned by the second terminal and that indicates that the call is normal is received, the current status of the call indicates that the call is normal. It should be noted that, if the enterprise network in which the first terminal is located and an external network in which the second terminal is located are networks of different types, for example, the enterprise network is an IP network, and the external network is a PSTN, when the signaling returned by the second terminal passes through a trunking gateway in the enterprise network, the trunking gateway performs format conversion on the signaling.

For another example, when signaling (for example, signaling 486 indicating that a called side is busy) that is returned by the called side and that indicates that the call fails is received, the current status of the call is a call failure.

For another example, when it is detected that the called side does not answer the call (for example, SIP signaling 488 indicating that the call is unanswered is received), the current status of the call is an unanswered state.

For another example, when it is detected that the calling terminal sends end signaling (for example, SIP Bye signaling) or receives end signaling returned by the called side, the current status of the call is a call end. The update message may further include an end time of the call and call duration calculated based on the end time of the call and the start time of the call.

Step S208: When receiving the update message, the information device updates information (for example, the current status) in the update message to the call record of the call, and sends an updated call record to the second terminal.

Specifically, the information device may actively send the updated call record to the second terminal, or may send the updated call record to the second terminal after receiving a request sent by the second terminal.

In an example of a specific implementation, the calling side information in the first call record uploaded in step S202 may further include description information of a user of the first terminal, for example, a name of the user or a department to which the user belongs.

In an example of a specific implementation, the information device may further pre-store information about a plurality of enterprise users in the enterprise network, and information about each enterprise user includes description information of the enterprise user and a number of a terminal of the enterprise user. Correspondingly, the call record uploaded in step S202 does not need to include the description information of the user of the first terminal. After step S204 is performed, and before step 205 is performed, the information device further obtains, based on the number of the first terminal, description information of a target enterprise user corresponding to the number of the first terminal from the information about the plurality of enterprise users, and sends the description information of the target enterprise user to the second terminal in step 205 by adding the description information of the target enterprise user to the first query response.

In an example of a specific implementation, there may be a case in which more than one calling terminal calls the second terminal at the same time, and a call request of only one calling terminal (for example, the first terminal) can reach the second terminal. In this case, during implementation of the scenario M, if the first terminal uploads the first call record before determining that the call is normal, for example, the first terminal uploads the call record before step S201 is performed, the information device cannot accurately determine a corresponding call record when receiving the first query request. In this case, in step S207, the calling terminal needs to determine, that the current status of the call indicates that the call is normal, and then send the update message to update the call record corresponding to the call. Correspondingly, the information device may select, as the first call record, a call record that is in several call records kept at moments closest to the moment of receiving the first query request and in which a status of a call indicates that the call is normal, and obtain the calling side information from the first call record, to send the calling side information to the second terminal.

The following further describes, with reference to FIG. 2B and FIG. 5B, a second implementation (referred to as an implementation B hereinafter) of the method provided in Embodiment 1 of the present invention.

Figure 5B:
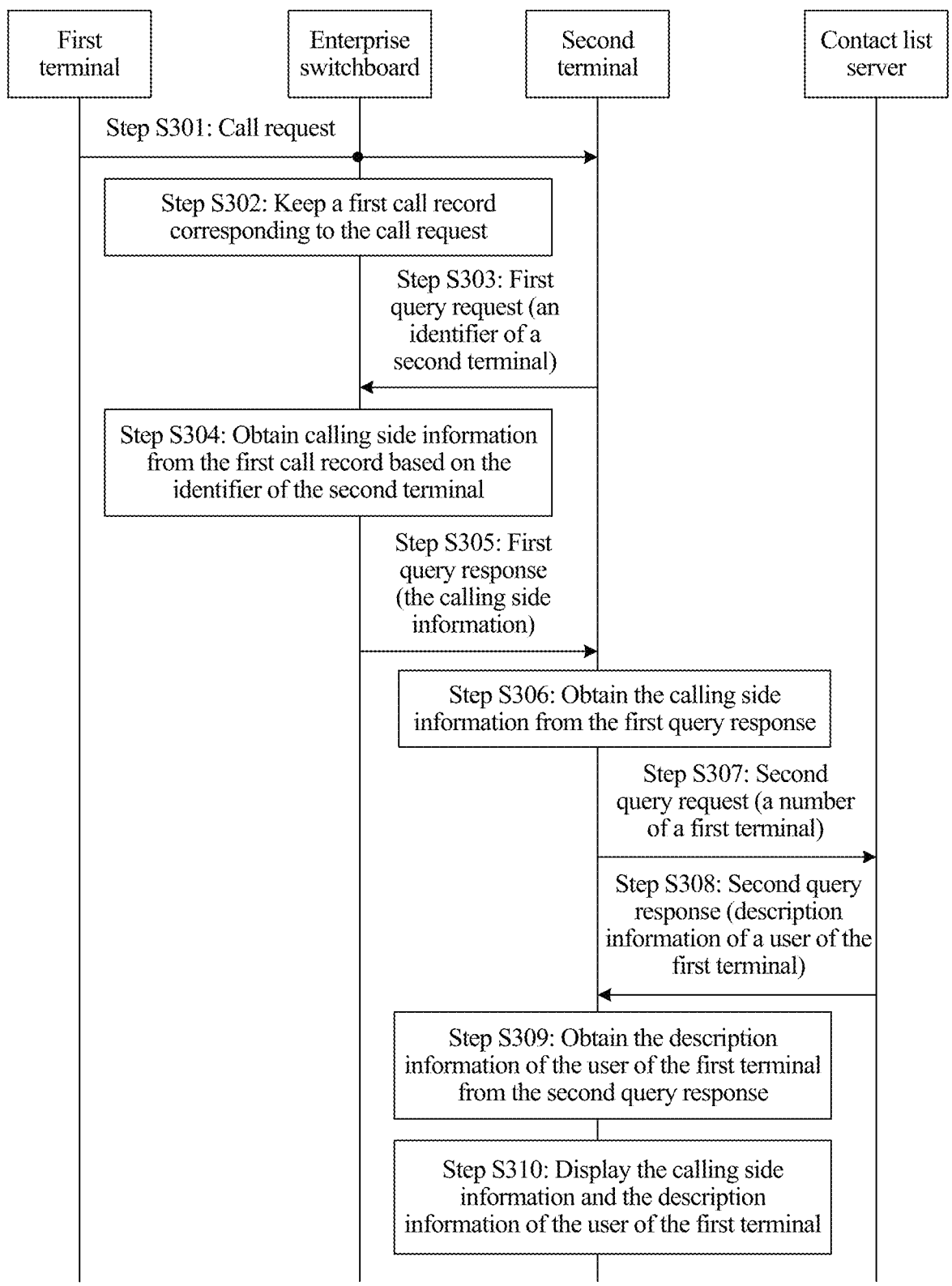

FIG. 5B is a schematic flowchart of the implementation B of the method according to Embodiment 1 of the present invention. The implementation B is applied to the communications system 100 shown in FIG. 2B.

Step S301 is the same as or similar to step S101. Details are not described again.

Step S302: The enterprise switchboard keeps a first call record corresponding to the call request when receiving the call request, where calling side information in the first call record includes a number of the first terminal, and called side information in the first call record includes an identifier of the second terminal.

The call record may further include a start time of a call.

Step S303: The second terminal sends a first query request to the enterprise switchboard after receiving the call request, where the first query request includes the identifier of the second terminal.

An address of the enterprise switchboard is preconfigured in the second terminal, and in step S303, the first query request is sent to the enterprise switchboard based on the address of the enterprise switchboard.

In addition, before sending the first query request, the second terminal may further first determine that a calling number in the call request is a switchboard number of the enterprise network. Correspondingly, if the second terminal determines that the calling number in the call request is not the switchboard number of the enterprise network, the second terminal does not send the first query request. Specifically, the second terminal may determine, based on the switchboard number that is of the enterprise network and that is stored in the second terminal, whether the calling number in the call request is the switchboard number of the enterprise network.

Step S304: The enterprise switchboard obtains the calling side information from the first call record based on the identifier of the second terminal when receiving the first query request that is sent by the second terminal and that includes the identifier of the second terminal.

Step S305: The enterprise switchboard sends a first query response including the calling side information to the second terminal.

Step S306: The second terminal obtains the calling side information from the first query response after receiving the first query response.

In the implementation B, the calling side information includes the number of the first terminal but not description information of a user of the first terminal.

Further, after step S306, the method may further include the following steps.

Step S307: The second terminal sends a second query request to a contact list server, where the second query request includes the number of the first terminal in the first query response.

An address of the contact list server is preconfigured in the second terminal, and the second terminal specifically sends the second query request to the contact list server based on the address of the contact list server.

The contact list server pre-stores information about a plurality of enterprise users in the enterprise network, and information about each enterprise user includes description information of the enterprise user and a number of a terminal of the enterprise user.

Step S308: After receiving the second query request, the contact list server obtains, based on the second query request, description information of a target enterprise user (namely, a user of the first terminal) corresponding to the number of the first terminal, and sends a second query response including the description information of the target enterprise user to the second terminal.

Step S309: The second terminal obtains the description information of the target enterprise user from the second query response after receiving the second query response.

Step 310: The second terminal displays the calling side information (including the number of the first terminal) obtained in step S306 and the description information of the user of the first terminal that is obtained in step S309.

After obtaining the number of the first terminal in step S306, the second terminal may immediately perform a part of step 310 to display the number of the first terminal, and after obtaining the description information of the user of the first terminal in step S309, the second terminal further performs the other part of step 310 to display the description information of the user of the first terminal. Alternatively, the second terminal may not temporarily display the number of the first terminal after obtaining the number of the first terminal in step S306, but after obtaining the description information of the user of the first terminal in step S309, the second terminal performs step 310 to simultaneously display the number of the first terminal and the description information of the user of the first terminal.

The following further describes, with reference to FIG. 2C and FIG. 5C-1 and FIG. 5C-2, a third implementation (referred to as an implementation C hereinafter) of the method provided in Embodiment 1 of the present invention.

Figures 1, 5C:
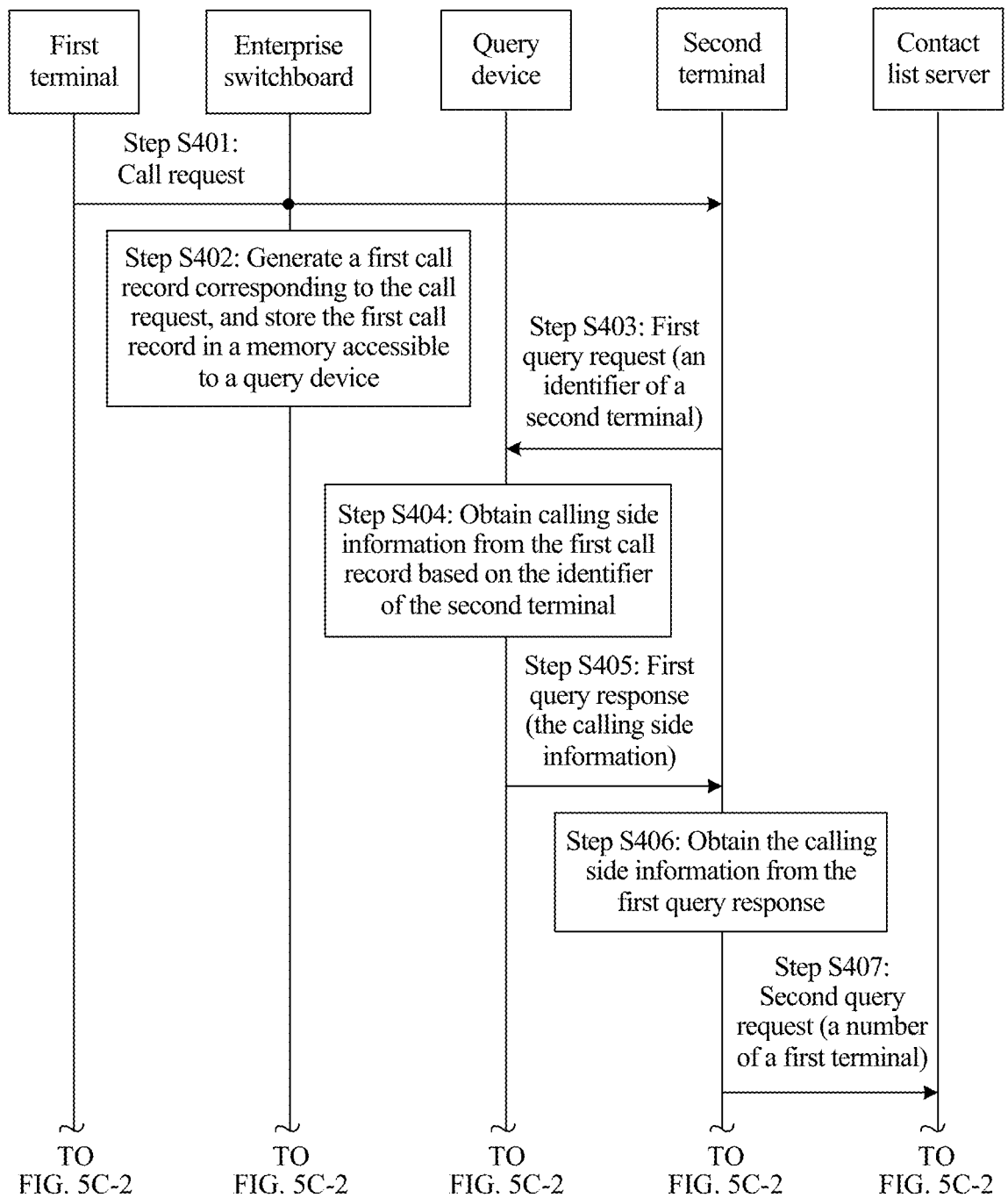
Figures 2, 5C:
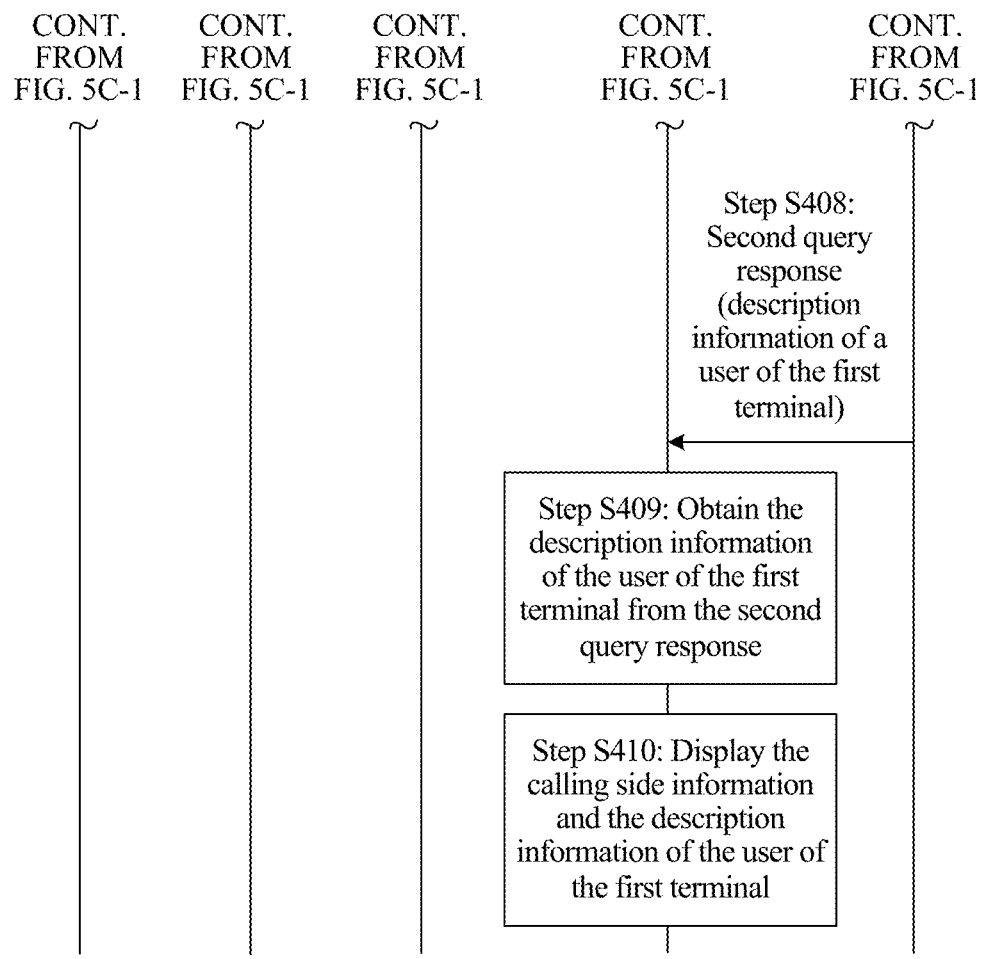

FIG. 5C-1 and FIG. 5C-2 are a schematic flowchart of the implementation C of the method according to Embodiment 1 of the present invention. The implementation C is applied to the communications system 100 shown in FIG. 2C.

Step S401 is the same as or similar to step S301. Details are not described again.

Step S402: The enterprise switchboard generates a first call record corresponding to the call request when receiving the call request, and stores the first call record in a memory accessible to a query device, where calling side information in the first call record includes a number of the first terminal, and called side information in the first call record includes an identifier of the second terminal.

The memory may be a memory in the enterprise switchboard, a memory of the query device, or a memory of a storage device connected to both the enterprise switchboard and the query device.

Step S403: The second terminal sends a first query request to the query device after receiving the call request, where the first query request includes the identifier of the second terminal.

An address of the query device is preconfigured in the second terminal, and in step S403, the first query request is sent to the query device based on the address of the query device.

In addition, before sending the first query request, the second terminal may further first determine that a calling number in the call request is a switchboard number of the enterprise network. Correspondingly, if the second terminal determines that the calling number in the call request is not the switchboard number of the enterprise network, the second terminal does not send the first query request. Specifically, the second terminal may determine, based on the switchboard number that is of the enterprise network and that is stored in the second terminal, whether the calling number in the call request is the switchboard number of the enterprise network.

Step S404: The query device obtains the calling side information from the first call record based on the identifier of the second terminal when receiving the first query request that is sent by the second terminal and that includes the identifier of the second terminal.

Step S405: The query device sends a first query response including the calling side information to the second terminal.

Step S406: The second terminal obtains the calling side information from the first query response after receiving the first query response.

In the implementation C, the calling side information includes the number of the first terminal but not description information of a user of the first terminal.

Further, after step S406, the method may further include the following steps.

Step S407: The second terminal sends a second query request to a contact list server, where the second query request includes the number of the first terminal in the first query response.

An address of the contact list server is preconfigured in the second terminal, and the second terminal specifically sends the second query request to the contact list server based on the address of the contact list server.

The contact list server pre-stores information about a plurality of enterprise users in the enterprise network, and information about each enterprise user includes description information of the enterprise user and a number of a terminal of the enterprise user.

Step S408: After receiving the second query request, the contact list server obtains, based on the second query request, description information of a target enterprise user (namely, a user of the first terminal) corresponding to the number of the first terminal, and sends a second query response including the description information of the target enterprise user to the second terminal.

Step S409: The second terminal obtains the description information of the target enterprise user from the second query response after receiving the second query response.

Step 410: The second terminal displays the calling side information (including the number of the first terminal) obtained in step S406 and the description information of the user of the first terminal that is obtained in step S409.

After obtaining the number of the first terminal in step S406, the second terminal may immediately perform a part of step 410 to display the number of the first terminal, and after obtaining the description information of the user of the first terminal in step S409, the second terminal further performs the other part of step 410 to display the description information of the user of the first terminal. Alternatively, the second terminal may not temporarily display the number of the first terminal after obtaining the number of the first terminal in step S406, but after obtaining the description information of the user of the first terminal in step S409, the second terminal performs step 410 to simultaneously display the number of the first terminal and the description information of the user of the first terminal.

In an example of a specific implementation, there may be a scenario including a plurality of enterprise switchboards. For example, there are a plurality of enterprise switchboards in one enterprise network, and different enterprise switchboards have different switchboard numbers. For another example, there are a plurality of enterprise networks, there is one enterprise switchboard in each enterprise network, and different enterprise switchboards have different switchboard numbers. Correspondingly, the first query request may further include a switchboard number (referred to as a first switchboard number hereinafter) obtained from the call request, and after receiving the first query request, the query device obtains, based on the first switchboard number, the calling side information from the first call record generated by the enterprise switchboard. In an implementation, call records generated by different enterprise switchboards are stored in their respective memories. After receiving the first query request, the query device determines a corresponding enterprise switchboard based on the first switchboard number, and queries, in a memory of the enterprise switchboard for the calling side information in the first call record. In another implementation, call records generated by different enterprise switchboards are all stored in the memory of the storage device or the memory of the query device, and each call record further includes a switchboard number of a corresponding enterprise switchboard. After receiving the first query request, the query device determines the first call record in call records including the first switchboard number, and obtains the calling side information from the first call record.

According to the method provided in Embodiment 1 of the present invention, when the calling terminal (namely, the first terminal) calls the called terminal (namely, the second terminal) by using the enterprise switchboard, the information device keeps the call record including the number of the calling terminal, so that after receiving the call request, the called terminal can obtain the number of the calling terminal corresponding to the current call from the information device and display the number of the calling terminal. Therefore, the user of the called terminal can identify a real calling user based on the number, and can call the calling terminal by using the number, and user experience is better.

Figure 6:
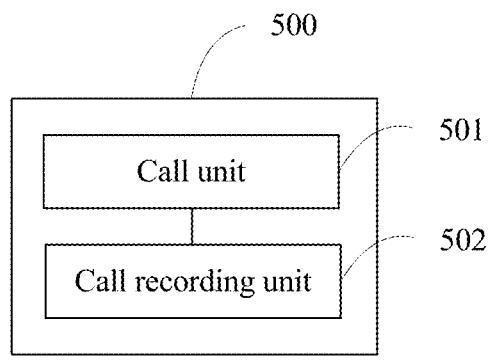
FIG. 6 is a schematic structural diagram of a communications apparatus 500 according to Embodiment 2 of the present invention.

Based on Embodiment 1 of the present invention, Embodiment 2 of the present invention provides a communications apparatus 500, and the communications apparatus 500 may be specifically the first terminal 110 in the communications system shown in FIG. 2A. As shown in FIG. 6, the communications apparatus 500 includes a call unit 501 and a call recording unit 502.

The call unit 501 is configured to send a call request to a called terminal by using an enterprise switchboard in an enterprise network. The called terminal may be specifically the second terminal 120 in the communications system shown in FIG. 2A, and the enterprise switchboard may be specifically the enterprise switchboard 140 in the communications system shown in FIG. 2A.

The call recording unit 502 is configured to send a first call record to a contact list server, where calling side information in the first call record includes a number of the communications apparatus, and called side information in the first call record includes an identifier of the called terminal. The contact list server may be specifically the contact list server 130 in the communications system shown in FIG. 2A.

In an example of a specific implementation, the call recording unit 502 may be configured to send the first call record to the contact list server before sending the call request or when sending the call request.

In an example of a specific implementation, the call recording unit 502 may further send the first call record when determining that a number of the called terminal is a mobile number.

The communications apparatus 500 described in Embodiment 2 of the present invention may be configured to implement an operation performed by the first terminal in the method described in the foregoing Embodiment 1. Specifically, the communications apparatus 500 may be an extension in the enterprise network, or may be a UC client or a mobile terminal that runs a UC client.

According to the communications apparatus 500 provided in Embodiment 2 of the present invention, when a calling terminal (namely, the communications apparatus 500) calls the called terminal by using the enterprise switchboard, the calling terminal may upload, to the contact list server, a call record corresponding to the call request, so that the called terminal can obtain a number of the calling terminal corresponding to the current call from the contact list server. Therefore, a user of the called terminal can identify a real calling user, and can call the calling terminal by using the number, and user experience is better.

Figure 7:
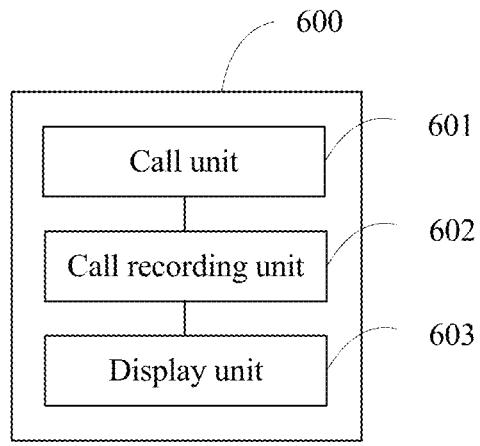
FIG. 7 is a schematic structural diagram of a communications apparatus 600 according to Embodiment 3 of the present invention.

Based on Embodiment 1 of the present invention, Embodiment 3 of the present invention provides a communications apparatus 600, and the communications apparatus 600 may be specifically the second terminal 120 in the communications system shown in FIG. 1. As shown in FIG. 7, the communications apparatus 600 includes a call unit 601, a call recording unit 602, and a display unit 603.

The call unit 601 is configured to receive a call request sent by a first terminal by using an enterprise switchboard. The first terminal may be specifically the first terminal 110 in the communications system shown in FIG. 1.

The call recording unit 602 is configured to: send a first query request to an information device after the call unit 601 receives the call request, where the first query request includes an identifier of the communications apparatus; and receive a first query response returned by the information device, where the first query response includes information about the first terminal, and the information about the first terminal includes a number of the first terminal. The information device may be specifically the information device 130 in the communications system shown in FIG. 1.

The call recording unit 602 may be specifically configured to send the first query request when determining that a calling number in the call request is a switchboard number of an enterprise network. Specifically, the call recording unit 602 may determine, based on the switchboard number that is of the enterprise network and that is stored in the communications apparatus 600, whether the calling number in the call request is the switchboard number of the enterprise network.

The display unit 603 is configured to display the information about the first terminal in the first query response received by the call recording unit 602.

During implementation of the scenario M in Embodiment 1 of the present invention, the call unit 601 may be specifically configured to detect whether the call request is received. Correspondingly, the call recording unit 602 may be specifically configured to send the first query request when the call unit 601 detects that the call request is received. The display unit 603 may be specifically configured to display, in a suspended window on a caller identification display screen of the second terminal, the calling side information in the first query response when the call recording unit 602 receives the first query response.

During implementation of the scenario N in Embodiment 1 of the present invention, the call unit 601 may be further configured to detect a status of a call corresponding to the call request. Correspondingly, the call recording unit 602 may be specifically configured to send the first query request when the call unit 601 detects that the call is unanswered. The display unit 603 may be specifically configured to display the calling side information on a missed call display screen of the second terminal.

The communications apparatus 600 described in Embodiment 3 of the present invention may be configured to implement an operation performed by the second terminal in the method described in the foregoing Embodiment 1. Specifically, the communications apparatus 600 may be an app that implements a function of querying and displaying the calling side information, or may be a mobile terminal that implements a function of querying and displaying the calling side information, for example, a mobile terminal on which the app is configured.

According to the communications apparatus 600 provided in Embodiment 3 of the present invention, when a calling terminal (namely, the first terminal) calls a called terminal (namely, the communications apparatus 600) by using the enterprise switchboard, after receiving the call request, the called terminal may obtain a number of the calling terminal corresponding to the current call from the information device, and display the number of the calling terminal. Therefore, a user of the called terminal can identify a real calling user based on the number, and can call the calling terminal by using the number, and user experience is better.

Figure 8A:
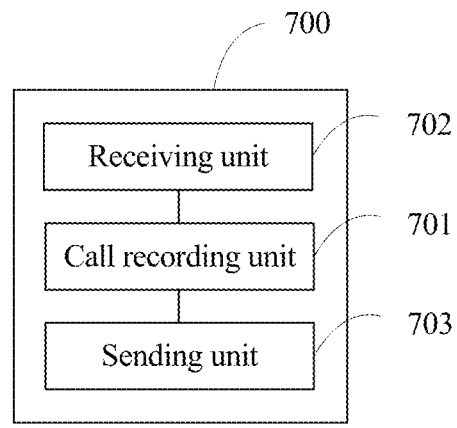
FIG. 8A and FIG. 8B are schematic structural diagrams of an information device 700 according to Embodiment 4 of the present invention.

Based on Embodiment 1 of the present invention, Embodiment 4 of the present invention provides an information device 700. The information device 700 may be specifically the information device 130 in the communications system shown in FIG. 1. As shown in FIG. 8A, the information device 700 includes a call recording unit 701, a receiving unit 702, and a sending unit 703.

The call recording unit 701 is configured to: keep a first call record that corresponds to a call request sent by a first terminal to a second terminal by using an enterprise switchboard in an enterprise network, where calling side information in the first call record includes a number of the first terminal, and called side information in the first call record includes an identifier of the second terminal; obtain the calling side information from the first call record based on the identifier of the second terminal when the receiving unit 702 receives a first query request that is sent by the second terminal and that includes the identifier of the second terminal; and send, by using the sending unit 703, a first query response including the calling side information to the second terminal. The first terminal may be specifically the first terminal 110 in the communications system shown in FIG. 1, and the second terminal may be specifically the second terminal 120 in the communications system shown in FIG. 1.

The receiving unit 702 is configured to receive the first query request.

The sending unit 703 is configured to send the first query response.

During implementation of the scenario M in Embodiment 1 of the present invention, the call recording unit 701 may be specifically configured to: determine, as the first call record, a call record that is of a call made at a moment closest to a moment of receiving the first query request and that is in call records whose recorded called side information includes the identifier of the second terminal, and obtain the calling side information from the first call record.

During implementation of the scenario N in Embodiment 1 of the present invention, the call recording unit 701 may be specifically configured to: determine, as the first call record, a call record that is of a call made at a moment closest to a moment of receiving the first query request and that is in unanswered-state call records whose recorded called side information includes the identifier of the second terminal, and obtain the calling side information from the first call record.

Figure 8B:
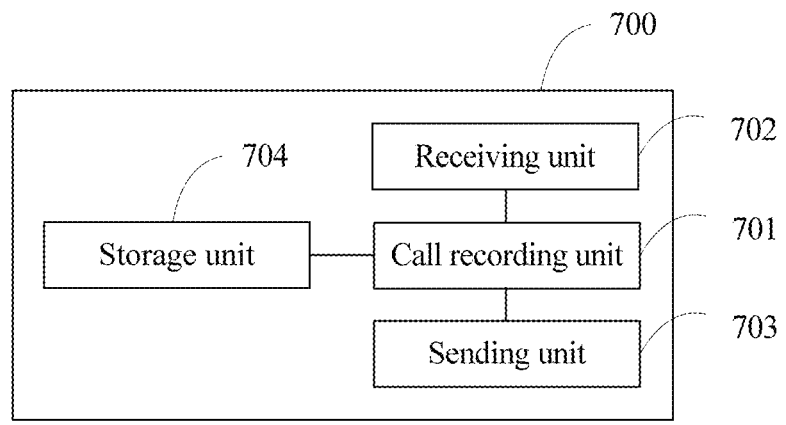

Further, as shown in FIG. 8B, the information device may further include a storage unit 704. The storage unit 704 is configured to store information about a plurality of enterprise users in the enterprise network, where information about each enterprise user includes description information of the enterprise user and a number of a terminal of the enterprise user. Correspondingly, the call recording unit 701 may be further configured to: obtain, based on the number of the first terminal, description information of a target enterprise user corresponding to the number of the first terminal from the information about the plurality of enterprise users that is stored in the storage unit 704; and send, by using the sending unit 703, the description information of the target enterprise user to the second terminal by adding the description information of the target enterprise user to the first query response.

The information device 700 described in Embodiment 4 of the present invention may be configured to implement an operation performed by the information device 130 in the method described in the foregoing Embodiment 1.

According to the information device 700 provided in Embodiment 4 of the present invention, when a calling terminal (namely, the first terminal) calls a called terminal (namely, the second terminal) by using the enterprise switchboard, the information device 700 keeps the call record including a number of the calling terminal, so that after receiving the call request, the called terminal can obtain the number of the calling terminal corresponding to the current call from the information device and display the number of the calling terminal. Therefore, a user of the called terminal can identify a real calling user based on the number, and can call the calling terminal by using the number, and user experience is better.

Figure 9:
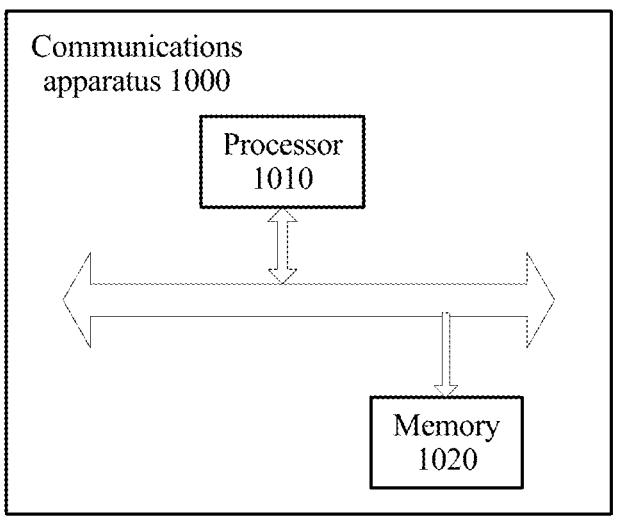
FIG. 9 is a schematic structural diagram of a communications apparatus 1000 according to Embodiment 5 of the present invention.

Based on Embodiment 1 of the present invention, Embodiment 5 of the present invention provides a communications apparatus 1000. As shown in FIG. 9, the communications apparatus 1000 includes a processor (processor) 1010 and a memory (memory) 1020, and the processor 1010 and the memory 1020 communicate with each other by using a bus.

The memory 1020 is configured to store a computer operation instruction. The memory 1020 may include a high-speed RAM memory, and may further include a non-volatile memory (non-volatile memory), for example, at least one magnetic disk memory.

The processor 1010 is configured to execute the computer operation instruction stored in the memory 1020. The processor 1010 may be specifically a central processing unit (CPU, central processing unit), and is a core unit of a computer.

The processor 1010 executes the computer operation instruction, so that the communications apparatus 1000 performs an operation performed by the first terminal in the method described in the foregoing Embodiment 1. Specifically, the communications apparatus 1000 may be an extension in an enterprise network, or may be a mobile terminal that runs a UC client.

According to the communications apparatus 1000 provided in Embodiment 5 of the present invention, when a calling terminal (namely, the communications apparatus 1000) calls a called terminal by using an enterprise switchboard, the calling terminal may upload, to a contact list server, a call record corresponding to a call request, so that the called terminal can obtain a number of the calling terminal corresponding to the current call from the contact list server. Therefore, a user of the called terminal can identify a real calling user, and can call the calling terminal by using the number, and user experience is better.

Figure 10:
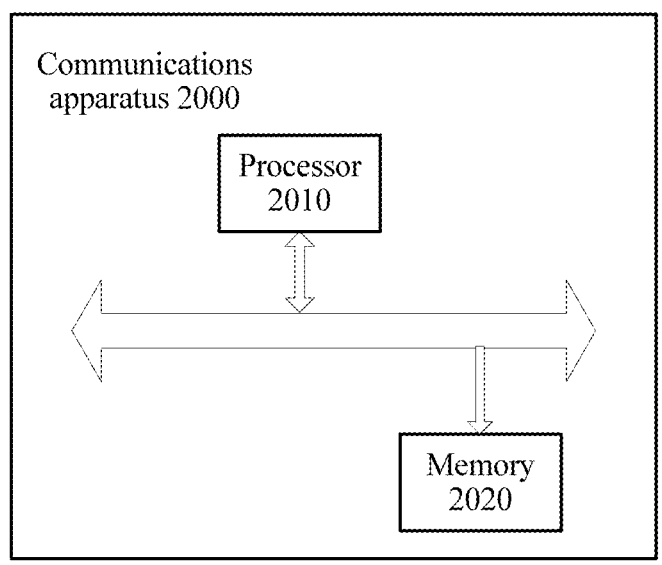
FIG. 10 is a schematic structural diagram of a communications apparatus 2000 according to Embodiment 6 of the present invention.

According to Embodiment 1 of the present invention, Embodiment 6 of the present invention provides a communications apparatus 2000. As shown in FIG. 10, the communications apparatus 2000 includes a processor (processor) 2010 and a memory (memory) 2020, and the processor 2010 and the memory 2020 communicate with each other by using a bus.

The memory 2020 is configured to store a computer operation instruction. The memory 2020 may include a high-speed RAM memory, and may further include a non-volatile memory (non-volatile memory), for example, at least one magnetic disk memory.

The processor 2010 is configured to execute the computer operation instruction stored in the memory 2020. The processor 2010 may be specifically a central processing unit (CPU, central processing unit), and is a core unit of a computer.

The processor 2010 executes the computer operation instruction, so that the communications apparatus 2000 performs an operation performed by the second terminal in the method described in the foregoing Embodiment 1.

According to the communications apparatus 2000 provided in Embodiment 6 of the present invention, when a calling terminal (namely, a first terminal) calls a called terminal (namely, the communications apparatus 2000) by using an enterprise switchboard, after receiving a call request, the called terminal may obtain a number of the calling terminal corresponding to the current call from the information device, and display the number of the calling terminal. Therefore, a user of the called terminal can identify a real calling user based on the number, and can call the calling terminal by using the number, and user experience is better.

Figure 11:
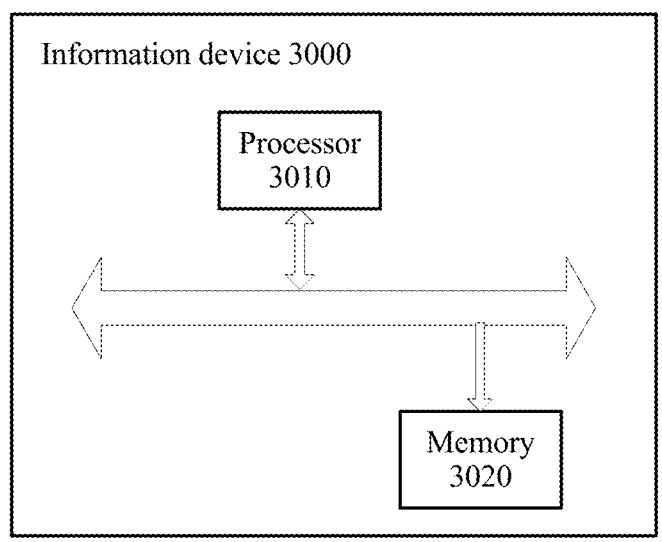
FIG. 11 is a schematic structural diagram of an information device 3000 according to Embodiment 7 of the present invention.

Based on Embodiment 1 of the present invention, Embodiment 7 of the present invention provides an information device 3000. As shown in FIG. 11, the information device 3000 includes a processor (processor) 3010 and a memory (memory) 3020, and the processor 3010 and the memory 3020 communicate with each other by using a bus.

The memory 3020 is configured to store a computer operation instruction. The memory 3020 may include a high-speed RAM memory, and may further include a non-volatile memory (non-volatile memory), for example, at least one magnetic disk memory.

The processor 3010 is configured to execute the computer operation instruction stored in the memory 3020. The processor 3010 may be specifically a central processing unit (CPU, central processing unit), and is a core unit of a computer.

The processor 3010 executes the computer operation instruction, so that the information device 3000 performs an operation performed by the information device 130 in the method described in the foregoing Embodiment 1.

According to the information device 3000 provided in Embodiment 7 of the present invention, when a calling terminal (namely, a first terminal) calls a called terminal (namely, a second terminal) by using an enterprise switchboard, the information device 3000 keeps a call record including a number of the calling terminal, so that after receiving a call request, the called terminal can obtain the number of the calling terminal corresponding to the current call from the information device and display the number of the calling terminal. Therefore, a user of the called terminal can identify a real calling user based on the number, and can call the calling terminal by using the number, and user experience is better.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A communication method, wherein the method comprises:
   sending, by a first terminal from within an enterprise network, a call request to a second terminal outside of the enterprise network, the first terminal sending the call request using an enterprise switchboard in an enterprise network; and
   sending, by the first terminal to a contact list server, a first call record corresponding to the call request, wherein calling side information in the first call record comprises a number of the first terminal, and called side information in the first call record comprises an identifier of the second terminal.

2. The communication method according to claim 1, wherein the sending, by the first terminal to the contact list server, the first call record corresponding to the call request comprises: sending, by the first terminal, the first call record to the contact list server before sending the call request or when sending the call request.

3. The communication method according to claim 1, wherein the sending, by the first terminal to the contact list server, the first call record corresponding to the call request comprises: sending, by the first terminal, the first call record when determining that a number of the called second terminal is a mobile number.

4. A communication method, wherein the method comprises:
   sending, by a second terminal outside of an enterprise network, a first query request to an information device after receiving a call request sent by a first terminal from within an enterprise network using an enterprise switchboard, wherein the first query request comprises an identifier of the second terminal;
   receiving, by the second terminal, a first query response returned by the information device, wherein the first query response comprises information about the first terminal, and the information about the first terminal comprises a number of the first terminal, wherein the information about the first terminal is provided by the first terminal to the information device when sending a call request; and
   displaying, by the second terminal, the information about the first terminal in the first query response.

5. The communication method according to claim 4, wherein the sending, by the second terminal, the first query request to an information device after receiving a call request from a first terminal comprises: sending, by the second terminal, the first query request when detecting the call request.

6. The communication method according to claim 5, wherein the displaying, by the second terminal, the information about the first terminal in the first query response comprises: displaying, by the second terminal in a suspended window on a caller identification display screen of the second terminal, calling side information in the first query response when receiving the first query response.

7. The communication method according to claim 4, wherein the sending, by the second terminal, the first query request to the information device after receiving the call request from the first terminal comprises: sending, by the second terminal, the first query request when detecting that a call corresponding to the call request is unanswered.

8. A communication method, wherein the method comprises:
   keeping a first call record that corresponds to a call request sent by a first terminal from within an enterprise network to a second terminal outside of the enterprise network using an enterprise switchboard in an enterprise network, wherein calling side information in the first call record comprises a number of the first terminal, and called side information in the first call record comprises an identifier of the second terminal; and
   obtaining the calling side information from the first call record based on the identifier of the second terminal when receiving a first query request that is sent by the second terminal and that comprises the identifier of the second terminal; and
   sending a first query response comprising the calling side information to the second terminal.

9. The communication method according to claim 8, wherein the obtaining the calling side information from the first call record based on the identifier of the second terminal comprises: determining, as the first call record, a call record that is of a call made at a moment closest to a moment of receiving the first query request and that is in call records whose recorded called side information comprises the identifier of the second terminal, and obtaining the calling side information from the first call record.

10. The communication method according to claim 8, wherein the first call record further comprises a status of a call corresponding to the call request; and
   the obtaining the calling side information from the first call record based on the identifier of the second terminal comprises: determining, as the first call record, a call record that is of a call made at a moment closest to a moment of receiving the first query request and that is in unanswered-state call records whose recorded called side information comprises the identifier of the second terminal, and obtaining the calling side information from the first call record.

11. The communication method according to claim 8, wherein after the obtaining the calling side information from the first call record based on the identifier of the second terminal, the method further comprises:
   obtaining, based on the number of the first terminal, description information of a target enterprise user corresponding to the number of the first terminal from pre-stored information about a plurality of enterprise users, and sending the description information of the target enterprise user to the second terminal by adding the description information of the target enterprise user to the first query response, wherein information about each enterprise user in the information about the plurality of enterprise users comprises description information of the enterprise user and a number of a terminal of the enterprise user.

12. A communications apparatus comprising:
   a call unit configured to receive a call request sent by a first terminal from within an enterprise network using an enterprise switchboard in the enterprise network;
   a call recording configured to:
      send a first query request to an information device after the call unit receives the call request, wherein the first query request comprises an identifier of the communications apparatus, and wherein a call record corresponding to the call request is provided by the first terminal to the information device when the first terminal sends the call request to the communication apparatus, and receive a first query response returned by the information device, wherein the first query response comprises information about the first terminal, and the information about the first terminal comprises a number of the first terminal; and a display unit configured to display the information about the first terminal in the first query response received by the call recording unit.

13. The communications apparatus according to claim 12, wherein the call unit is configured to detect whether the call request is received; and the call recording unit is configured to send the first query request when the call unit detects that the call request is received.

14. The communications apparatus according to claim 13, wherein the display unit is configured to display, in a suspended window on a caller identification display screen of a second terminal, a calling side information in the first query response when the call recording unit receives the first query response.

15. The communications apparatus according to claim 12, wherein the call unit is further configured to detect a status of a call corresponding to the call request; and the call recording unit is configured to send the first query request when the call unit detects that the call is unanswered.

* * * * *